Aug. 6, 1935.    A. PREISMAN    2,010,243

METHOD AND APPARATUS FOR MEASURING ELECTRICAL CONDUCTIVITY

Original Filed April 17, 1928

INVENTOR

Albert Preisman

Patented Aug. 6, 1935

2,010,243

UNITED STATES PATENT OFFICE 2,010,243

METHOD AND APPARATUS FOR MEASURING ELECTRICAL CONDUCTIVITY

Albert Preisman, New York, N. Y.

Original application April 17, 1928, Serial No. 270,741. Divided and this application February 24, 1932, Serial No. 594,879

10 Claims. (Cl. 175—183)

My present invention relates to methods of, and apparatus for electrical measurements, and has particular reference to a method of, and apparatus for ascertaining the electrical conductivity of materials, the present application being a division of my copending application Serial No. 270,741, filed April 17, 1928, now Patent No. 1,966,185.

Practical experience has revealed various defects in ohmmeters in present usage. For example if resistances are measured which are indicated near the infinity end of the scale of present day ohmmeters, wholly unreliable readings are obtained.

Again ohmmeters now in use that are adapted to measure high resistances are expensive and built of dynamic parts that are delicate. Moreover, they cannot utilize alternating current as a source of potential. All these limitations handicap their every day use.

Now, I have discovered certain principles involved in the performance of the well known audion or electronic discharge tube, and applied them in an effort to produce an instrument which will not only be an ohmmeter capable of accurately measuring resistances, but one that is capable of many independent uses, and yet be comparatively inexpensive, rugged in construction, and capable of use with alternating current as well as direct current.

Heretofore it has been considered that if the grid element of an electronic discharge tube, hereinafter referred to as an audion for brevity, be insulated from the filament element by a resistance of forty megohms or more, then it will be "free". That is to say, it will assume a potential in most cases which is negative with respect to the cold negative end of the filament.

Again, prior to my discovery, it has been thought that the "free" grid potential is not a reproducible value but that it depends upon the values of the filament and plate voltage, and also upon which of the two circuits, the plate or filament, is closed first.

But, using standard UX201A, UX240 and UX210 tubes, I have found the "free" grid to be always negative relative to the filament. Again, I have discovered that contrary to the aforementioned teachings of the prior art, the potential of a "free" grid, as measured by the plate current, is always the same for the filament and plate potentials, or if both of these be increased or decreased by a reasonably small amount, the plate current due to the "free" grid is practically unchanged.

In the said original copending application it has been demonstrated from purely mathematical and physical considerations, sustained by experimental verification, that by measuring the plate current of an audion tube having the material to be measured connected in series between a grid battery and the grid, I can ascertain quantitatively the conductivity of the material even if this be very low and comparable with the leakage in the tube and associated parts. I have, in addition thereto, devised various arrangements which enable this fundamental invention to be readily operated with any type of audion tube, and applied to uses to be hereinafter fully disclosed.

While one of the principal uses of the principles above described is for the measurement of resistance or conductivity, especially if the former be of exceedingly high values, as from one to one thousand megohms, or more, the invention is also applicable to other uses. One of these uses involves the employment of the invention as a ground detector in an ungrounded electrical system, such as a two phase four wire ungrounded system.

Accordingly one of the main objects of my invention is to provide a method of, and apparatus for indicating quantitatively the conductivity of materials, comprising inserting such materials in series with the grid of an electronic discharge tube, and a source of grid potential, the value of the plate current of said tube at a specific grid potential being a measure of the conductivity of the particular material being measured.

Another object of my invention is to provide a direct reading ohmmeter comprising an electronic discharge tube having a material to be measured and a source of grid potential in series with the grid of the tube, the said grid potential source being adjustable to render the ohmmeter multi-range, and independent of tube or voltage variation.

Other objects of my invention are to improve generally the simplicity and efficiency of such devices and to provide a device or apparatus of this kind which is durable, reliable in operation, and economical to manufacture.

Still other objects of my invention will appear as the description proceeds, and such objects should be considered as included in the herein statement of the objects of invention.

The invention may now be more fully understood from the following description when read in connection with the accompanying drawing in which.

Figure 1:
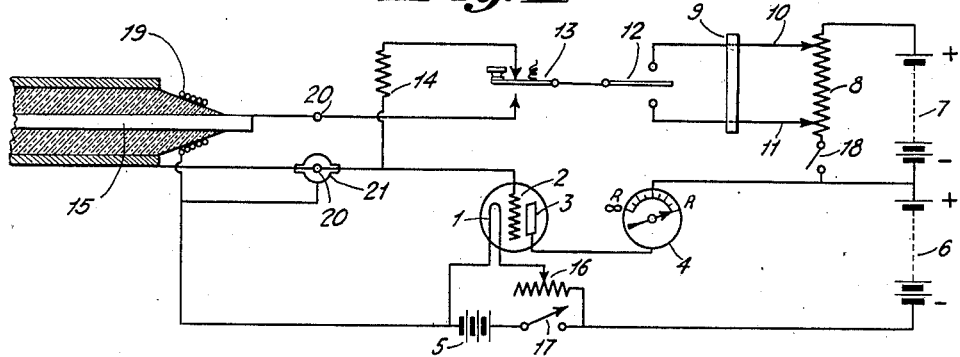
Fig. 1 is a circuit diagram of an apparatus, operated by direct current batteries, and adjustable for use with any audion tube, by means of which the method is carried out.

Referring to Fig. 1, reference characters 1, 2 and 3 designate the filament (electron emission electrode), grid and plate respectively of a tube of conventional design. The filament 1 is heated by a current source known as the filament or "A" battery and designated as 5. The thermionic current between the filament (hot cathode) and the plate (cold anode), is caused to flow through a plate current meter 4 (milliammeter) by means of a plate or "B" battery 6. Of course any other forms of electronic discharge devices may be employed in carrying my invention into effect.

The grid 2 is connected to a source of adjustable potential or grid battery 7 which is positive relative to the filament. As will be observed from Fig. 1, part of the "B" battery could be used as the grid battery. The material whose electrical characteristic is to be ascertained, is interposed in the circuit between the grid 2 and the battery 7. In Fig. 1 the insulation resistance of a cable 15 is to be measured. It should be noted that the cable possesses capacity as well as resistance.

A potentiometer 8 is placed in the circuit between the unknown cable resistance 15 and the grid battery 7 in order to adjust the positive potential being applied to the grid. This device is used to correct for tube or battery voltage variations. An insulated support 9 for two tap-offs 10, 11 constitutes the adjusting mechanism. The support 9 operates as one unit and thereby, by means of switch 12 which allows either grid potential to be applied to the grid 2, gives the instrument two ranges since either tap 10 or 11 may be connected to the grid. The advantage of such an arrangement will be explained later.

A conventional two-point push button switch 13, or any other type of double-throw switch, connects the potentiometer to the unknown cable resistance 15, or a calibrated high resistance 14. The calibrated resistance is normally connected to the switch 13 and is in circuit between the grid potential source 7 and the grid 2. Its purpose is to enable the plate meter 4 to be referred to a predetermined mark by varying the grid potentiometer 8, thus ensuring a constant reference point regardless of battery or tube variations.

Guard terminals 19 and 21 of conventional design are interposed in the circuit from the insulation of cable 15 and the contacts 20 to the filament battery 5. The purpose of the guard terminals is to prevent false readings due to leakage, whether in the set, or over the surface of the material being tested. These expedients assure accurate determinations when dealing with extremely high resistances.

A pair of battery switches 17 and 18 control the filament battery and grid battery respectively, and in actual construction they may be operated as a unit in the form of a two-pole single throw switch. To compensate for voltage variations in the battery 5 a filament rheostat 16 is inserted in the filament circuit.

As previously explained the plate meter 4 measures the resistance $R_x$ of the material between the contacts 20. If the resistance is infinite in value, as where the contacts 20 are not connected to anything, the grid 2 is essentially "free". It assumes a negative charge with respect to filament 1, thus causing the plate current to be very low. As this unknown resistance $R_x$ decreases through finite values, the grid, with the aid of the grid battery 7, is able to discharge to the cold end of the filament.

The grid thus becomes less negative thereby allowing the plate current $I_p$ to increase. This increase is noted on the milliammeter 4 in the plate circuit which may be calibrated to read directly in megohms. As shown in Fig. 1, and it being understood that the switches 12, 17 and 18 are closed, the pointer is at the low end of the scale, the scale reading directly in values of resistance R. As the resistance of the material being measured increases, the pointer moves to the left. When resistance of infinite value is measured, as explained before, the pointer is near the extreme left or infinity position of the scale. This should be obvious from the fact that, as stated in the previous paragraph, when the grid is "free" (that is to say, the resistance between the contacts 20, 20 is infinite), the plate current is very low.

For every value of $R_x$ there will be a corresponding value of $I_p$, provided all voltages are maintained constant at some predetermined values. The adjustable external grid potential 7 insures this in the following manner. I have determined experimentally that in order to adapt different tubes of the same type to the same scale on the meter 4, it is necessary to adjust the zero-error correction thereon, to get the same "free" grid reading. This is done by letting the unknown resistance be infinity, as would be the case with air. Then the smallest $R_x$ value is found that can be read on that scale range. In other words, it is necessary to adjust the instrument to read the same at the two extremes of the scale; namely, at $R_x = \infty$ and $R_x$=lowest value indicated on the scale.

This is accomplished by means of the calibrated resistance 14 and is based on the fact that while different tubes may vary in their actual plate currents for a given value of $R_x$ (unknown resistance) and $E_t$ (total grid voltage) their $R_x$ vs. $I_p$ curves are practically identical. Hence, if these curves for various tubes are matched at their extreme values, intermediate values will coincide to about an accuracy as can be detected on the meter 4.

In use, then, assuming that it has been predetermined that when the potentiometer 8 has been tapped as shown in Fig. 1, the switch 12 closed on a desired contact, and the switches 17, 18 closed, the meter 4 reads as shown in Fig. 1, when switch 13 is in normal position. That is to say, the resistance of the calibrated element 14 is being measured. Prior to this, the infinity resistance reading has been taken by leaving the contacts 20 free, and depressing the switch 13.

For different tubes this infinity reading on meter 4 may vary, but by means of the zero-error correction on the meter the pointer may be set to the infinity mark on the scale. Then, if the known resistance is off the calibrated resistance mark on the scale, by shifting 8, and releasing switch 13 so it is in normal position, the pointer of the meter may be set over the calibrated value on the scale. Obviously, adjusting the grid voltage would have no effect on the other end of the scale where the resistance is infinity.

Thus, when the cable 13 is now connected to the contacts 20, regardless of the fact that tubes have been changed or that a particular tube has been used for a long time, the switches 17, 18 are closed and the pointer observed on the meter 4. If the pointer is not over the calibrated value of the scale, the potentiometer 8 is adjusted until the pointer is over the value. Of course, the switch 12 is closed on either tap, depending on whether the higher potential represented by tap 10 is to be used, or whether the lower potential represented by tap 11 is to be used.

Then the key 13 is depressed and the pointer reading on the meter observed. Should other readings be taken, the key 13 constantly indicates due to its normal position that the instrument is reading true. If the battery strengths change, or any other variation occurs, the instrument can be made to read the same for all values of $R_x$ between infinity and the lowest value that can be read on the meter, by the means described above.

The advantages of using an adjustable external grid potential source may be summarized as follows:

1. It makes the instrument more sensitive to large values of $R_x$.
2. At the larger values of $R_x$, the scale is more open.
3. In conjunction with the zero-error adjustment of the meter, it enables different tubes to be adapted to the same scale on the plate meter, thus making the instrument a measuring device rather than a mere translating or indicating device.
4. It places $R_x$ in series with the tube and socket leakage instead of in parallel to it, so that $R_x$ can be read more accurately at high values, and also renders the instrument independent of relatively large variations in leakage.

Figure 2:
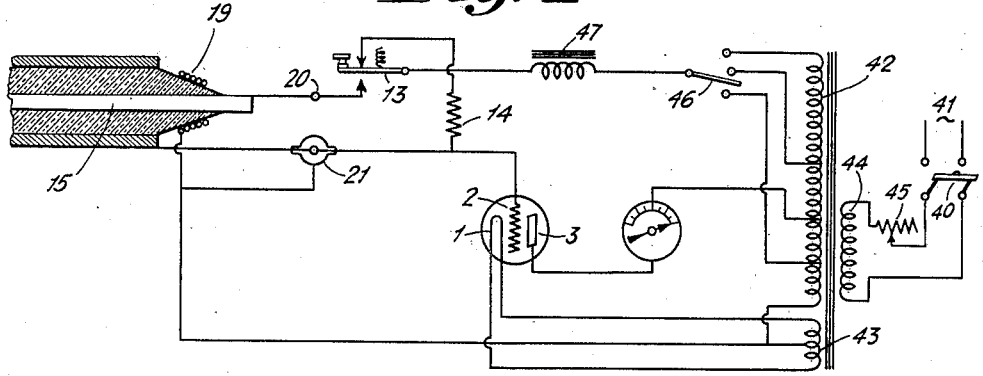
Fig. 2 is a circuit diagram showing the arrangement of the apparatus in Fig. 1, for connection to an alternating current source.

As stated heretofore, my invention with some changes can be applied to an alternating current source. In Fig. 2 is shown the tube 1, 2, 3 and plate meter 4 in circuit with the cable 15 to be measured and the calibrated resistance 14 as described heretofore. A double-pole single throw switch 40 closes the circuit and allows current from alternating current source 41 to flow therethrough. A transformer primary 44 has an adjustable resistance 45 connected thereto which compensates for variations in tube characteristics and line voltage. The function is similar to that of the adjustable potentiometer in Fig. 1.

A grid and plate secondary 42 tapped by a switch 46 serves to feed current to the plate and grid. By means of the switch 46 different grid voltages for different ranges of the instrument are procured. A filament secondary 43 connects to the filament and heats the filament. An inductance 47, of ten henries or more, is inserted in the grid circuit to balance the capacity in the unknown cable.

In this alternating current modification the rectifying properties of the grid or control element are used as well as its amplifying effect, and due to the former effect, pulsating direct current is applied to the unknown resistance.

Since plate current $I_p$, flows only during the half cycles when the plate is positive, it is only during these half cycles that the grid has any effect on $I_p$, and since the grid is also made positive through $R_x$ at these times, it can vary $I_p$ depending upon the value of $R_x$.

Since $R_x$ may have capacity $C_x$ as well, the inductance coil 47 is used to correct the decreasing effect of $C_x$ upon $I_p$, thus rendering the readings independent of $C_x$. This seems to be due to the fact that the inductance maintains the grid current, and therefore the grid potential, even after the potential $E_t$ has decreased to zero again. This is probably due to the fact that the inductance spreads the grid current pulses over a greater portion of the half cycle and thus prevents the charge in $C_x$ making the grid negative and thereby distorting the plate current by making it more peaked whereby the average or direct current value of it as measured on the plate milliammeter 4 would be lower.

In the operation of this alternating current embodiment, to calibrate the tube all voltages may be varied by adjusting the rheostat 45 in the primary circuit 44. This adjustment is available in addition to the infinity, or "free" grid, adjustment which is adjusted by means of the zero-error adjustment on the plate meter.

To obtain several ranges as explained before different values of $E_t$ may be used. To do this, the high tension secondary winding 42 is tapped at suitable points and connected through a rotary switch 46 to the line terminal.

Of course, this modification can be used in conjunction with any means for maintaining constant voltage across the primary and associated resistor.

Figure 3:
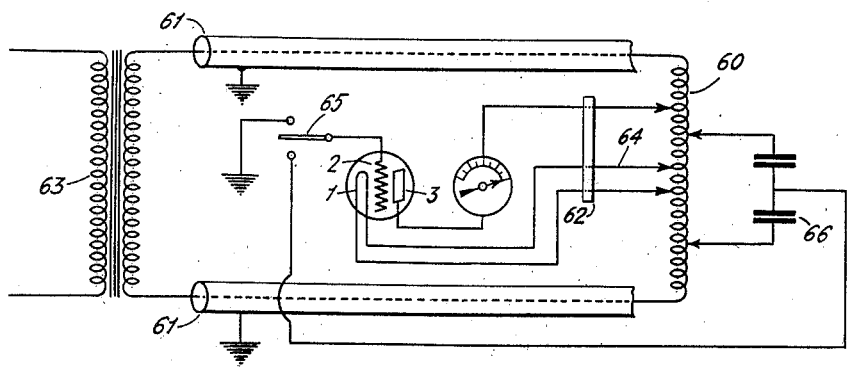
Fig. 3 shows an adaptation of the circuit of Fig. 2 as a ground detector for an ungrounded polyphase system.

Another application of my invention is as a ground detector on an ungrounded alternating current system. As shown in Fig. 3, the circuit is set up for one phase of a two phase ungrounded system. An auto transformer 60 is connected across the two live cables 61 which lead from the ungrounded secondary of the station-bank transformer 63. For a direct current system a resistor may be used instead of an auto-transformer. The auto-transformer 60 is tapped by a series of three taps 64 designed to move as a unit on a support 62. The lead sheaths of the cables 61 are grounded, as is also the grid of the audion tube.

It should be noted that normally the lower two taps 64 are slightly above the center point of the transformer 60, so that, if the capacity and insulation resistance of both cables are equal (or insulation resistance negligible), ground is half way in potential between the two live conductors, and the filament is therefore slightly positive to ground and therefore to grid.

A two-point switch 65 connects the grid 2 to the ground, or to the center-tap of two condensers 66 connected in series, which act as impedances. The condensers are so arranged that they tap off 60 at any points desired. The voltage to ground from either live cable depends upon the relative values of $C_x$ and $R_x$ for the insulation of each cable.

If these are the same for the two, and are uniformly distributed on all pieces of connected apparatus, the voltage from each live cable to ground is one half of the voltage between the two cables.

The grid is at ground potential, and, in the above case, would be half-way in potential from either conductor. Suppose the plate current $I_p$ may vary from zero to some safe allowable upper value, $I_{pm}$, and that the filament is adjusted on the auto-transformer to be at such a potential with respect to the grid that $I_p = \frac{1}{2} I_{pm}$. If, on the other hand, the grid becomes less negative, or even positive, with respect to the filament, $I_p$ increases above its normal value of $\frac{1}{2} I_{pm}$.

Normally, $C_x$ for the two cables remains constant if no changes are made in the circuit, and only $R_x$ may vary as the cable ages. If the top cable grounds, $R_x$ for its insulation decreases to a value, let us say, of ten megohms or less, while $R_x$ for the bottom cable remains unchanged. The ground shifts toward the top cable in potential, as does the grid connected to it, while the filament connected to 61, is kept at the same potential with respect to either cable as before. The grid thus becomes less negative with respect to the filament than it was before, or even positive to it, depending upon how effectively the top cable is grounded, and so $I_p$ increases.

If, on the other hand, the bottom cable grounds, the grid becomes more negative with respect to the filament, and $I_p$ decreases. If both cables ground equally, $I_p$ remains unchanged, but this is a fault common to practically all ground detectors, and is, moreover, unlikely to occur.

$I_p$ would change if another tube were used, or if the characteristics of this tube were to change. To check this, the impedances 66 are used. These may be resistances, inductances, or condensers. They are here shown as condensers, in order more closely to simulate the insulation impedance of the cables. These are designed to maintain their characteristics (impedance values) during the life of the detector, and when the latter is adjusted to the cable, the voltage across these two impedances is adjusted until, when the grid is switched over to their mid-point, the same plate current obtains. Hereafter, if $I_p$ changes in normal operation, and does not when the grid is connected to their center tap, we know that the two conductors have changed in potential to ground, the change in $I_p$ indicating which cable is at fault.

It will be obvious that the general principles herein disclosed may be employed in many other organizations widely different from those illustrated, without departing from the spirit of the invention as defined in the following claims.

What I claim is:

1. An apparatus of the class described, adapted to detect grounds on an ungrounded current conducting system, comprising audion means adapted to be connected to conductors in said system, audion plate-current indicating means in circuit with said audion, and means associated with said audion to indicate which conductor is grounded.

2. A device of the class described adapted to ascertain the conductivity of live cables in an ungrounded system comprising an audion tube, the grid of which is grounded, and connected to said cables, the insulation of each cable being connected between the conductor of each cable and the grid, means asssociated with said cable conductors to adjustably supply voltage to the filament and plate circuits of said tube, a plate meter in said plate circuit, variations in the leakage of any of said cables affecting the potential of said grid with respect to the filament whereby said plate meter indicates said variations, and means associated with said adjustable supply means to calibrate the device to render it independent of variations other than said insulation resistance variations.

3. A device comprising an electronic discharge tube having, at least, an electronic discharge cathode, anode, and control electrode, an ungrounded electrical system having conductors; means for obtaining a point of potential whose magnitude is fixed with respect to any desired two of the conductors; means for connecting the cathode to this point, means for grounding the control electrode, means in the anode circuit for ascertaining the anode current or its effects, whereby changes in the anode current or its effects show by their magnitude the amount of potential unbalance to ground of the two conductors, and by the direction of the change which conductor has changed its potential to ground from its original value.

4. A device comprising an electronic discharge tube having, at least, an electronic discharge cathode, anode, and control electrode, an ungrounded electrical system having conductors, means for obtaining a point of potential whose magnitude is fixed with respect to any desired two of the conductors, means for connecting the cathode to this point, means for connecting the anode to a point at some potential at least periodically positive with respect to the cathode, means in the anode circuit for ascertaining the anode current or its effects, means adapted to vary the indication of said measuring means for the purposes of calibration, two impedances connected in series across said means for obtaining a point of potential whose magnitude is fixed with respect to any desired two of the conductors, and means for associating either the center point between the above impedances, or ground, with the control electrode.

5. A device comprising an electronic discharge tube having, at least, an electronic discharge cathode, anode, and control electrode, an ungrounded electrical system having conductors, potentiometric means for obtaining a point of potential whose magnitude is fixed with respect to any two of said conductors across which potentiometric means is connected, means for connecting the cathode to this point, means for connecting the anode to a point on said potentiometric means which is at least periodically positive with respect to the cathode, means in the anode circuit for ascertaining the anode current or its effects, means adapted to vary the indication of said measuring means for the purposes of calibration, two impedances connected in series across a suitable portion of said potentiometric means and means for associating either the center point between the above impedances, or ground, with the control electrode.

6. A method of ground detection of an ungrounded electrical system, which consists in employing a system having a control and controlled circuits, maintaining one point in the control system at ground potential, and another point at a predetermined potential with respect to any desired conductor of the ungrounded system, and using the electrostatic potential difference between the aforesaid points as a means of directly controlling and thereby indicating effects in the controlled circuit, said effects serving as an indication of the electrostatic potential to ground of said conductor.

7. A method of detecting an electrostatic difference of potential between two charged bodies by maintaining the electronic discharge cathode of an electronic discharge tube at a fixed potential with respect to the two bodies, and maintaining the control electrode at the potential of some fixed reference point, such as ground, and noting variations, in the potential between these two electrodes, in the anode circuit.

8. A device comprising an electronic discharge tube provided with at least a cathode, anode and a control electrode, two conductors electrically independent of each other, means for obtaining a point of potential whose magnitude is fixed with respect to one of the conductors, means for associating the said cathode with this point, means for associating said control electrode with the other conductor, and means in the anode circuit of said tube to indicate the electrostatic potential between the above two conductors.

9. An apparatus, adapted to detect grounds on an ungrounded current conducting system including at least two conductors, comprising a tube having its cathode maintained at a fixed potential with respect to said conductors, the control grid of said tube being grounded, and means in the anode circuit of the tube for indicating the potential difference between said grid and cathode.

10. An arrangement for detecting grounding of an ungrounded electrical system including at least two conductors comprising a tube provided with a grounded grid, means for establishing the cathode at a predetermined potential with respect to either of said conductors, and means for indicating the amplified effect of the potential difference between said grid and cathode.

ALBERT PREISMAN.